Nov. 8, 1938.  H. G. STONE  2,136,030
PROCESS FOR PREPARING CELLULOSE ESTERS
Filed Oct. 14, 1936
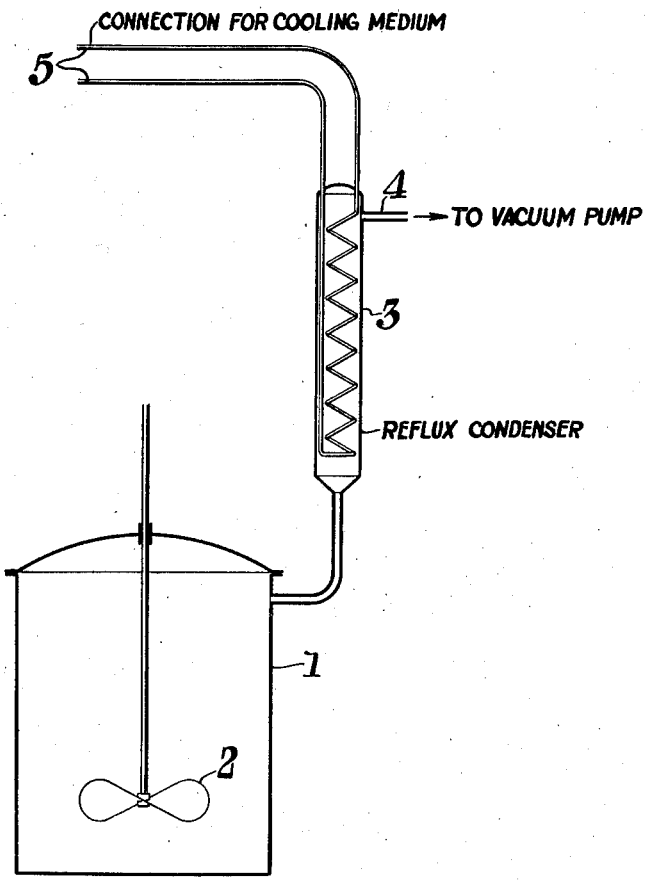
Herbert G. Stone,
INVENTOR Patented Nov. 8, 1938

2,136,030

UNITED STATES PATENT OFFICE 2,136,030

PROCESS FOR PREPARING CELLULOSE ESTERS

Herbert G. Stone, Kingsport, Tenn., assignor to Eastman Kodak Company, Rochester, N. Y., a corporation of New Jersey Application October 14, 1936, Serial No. 105,574

6 Claims. (Cl. 260—101)

This invention relates to the preparation of cellulose esters in which the temperature of the reaction mixture is regulated by carrying out the reaction under reduced pressure.

The acylation of cellulose is an exothermic reaction and, consequently some means for regulating the temperature is usually employed. This may be done either by external cooling of the reaction mixture or by retarding the rate at which the reaction occurs. Obviously in the latter case the time necessary for complete acetylation is somewhat extended and, therefore, that method is uneconomical. In the case of very large scale acylations, it is difficult to uniformly regulate the temperature by external cooling of the reaction mixture during the acylation.

Cooling of the reaction mixture by employing a volatile material therein has been suggested and although this method ordinarily results in fairly uniform cooling, nevertheless, there are several disadvantages which have prevented its wide-spread adoption. The solvents which have been mentioned for this purpose are liquid $SO_2$ and methylene chloride. Processes using these materials have the following disadvantages:

1. In the case of leakage, vapors of the solvent are lost.
2. Methylene chloride and $SO_2$ both have a high toxicity which interferes with their use in practical operations.
3. If methylene chloride or $SO_2$ are used as the solvent, it is necessary to conduct the subsequent hydrolysis of the cellulose ester, in the vessel employed for the acetylation, due to the difficulty of transferring the reaction mixture to a second vessel.
4. Methylene chloride and liquid $SO_2$ both have a high vapor pressure at acylation temperatures which renders it difficult to avoid some loss of these materials in their handling.

One object of the present invention is to provide a method of esterifying cellulose on a large scale in which the temperature is maintained uniform during the acylation but in which the amount of loss of ingredients and the toxicity danger are reduced and with a marked economy in the use of the acylation vessels. Another object of my invention is to provide a process which will produce cellulose esters of good quality in a large-size esterification vessel without degrading the cellulose or interfering with the quality of the resulting product.

I have found that if the process for the acylation of cellulose, using acetic acid as the solvent is carried out under reduced pressure, the product which is formed is not degraded or affected, due to the fairly low temperature at which the cellulose may be treated. I have found that the temperature within the reaction vessel in the acylation of cellulose in the ordinary manner may be controlled by reducing the pressure to the point at which the acetic acid boils, which will maintain the temperature during the esterification at the proper level and thus result in a high grade cellulose ester product.

My invention may be carried out with the ordinary type of esterification mixture which is mixed with the cellulose in an enclosed vessel, such as an autoclave in which the pressure is reduced by means of a vacuum pump. In order to eliminate loss from the evaporation of the acetic acid, a reflux condenser to condense the acetic acid vapors and return the condensed acid to the esterification vessel is provided. The degree of evacuation depends upon the degree of cooling which is desired. This depends somewhat on the rapidity at which the esterification is to be carried out and the desired viscosity of the product.

The drawing illustrates a simple apparatus for carrying out the esterification of cellulose in accordance with my invention. 1 designates an esterification vessel or mixer into which the cellulose and the esterification ingredients are placed. 2 is a stirrer or agitator to assure uniform distribution of the cellulose in the esterification mixer. 3 is a reflux condenser to prevent the escape of acetic acid vapors from the system. This reflux condenser is provided with a lead 4 which is connected to a vacuum pump to reduce the pressure in the system. 5 is a line to carry the cooling medium, such as water, brine or other liquid into the coil in the reflux condenser to condense the acetic acid vapors. Almost any type of esterification apparatus can be adapted for use in carrying out my invention, the only requisite being that the mixer can be tightly closed and is connected to a reflux condenser which is connected with some evacuating means. As pointed out above, the apparatus which can be employed to carry out my invention may be of the size desired in view of the fact that the cooling occurs uniformly throughout the esterification mixture and, therefore, the size of the reaction bath does not affect the final product which is produced. For instance, batches of a size up to several thousands of gallons, such as 7000 gal. of good quality cellulose acetate may be prepared by my invention.

The following example illustrates the carrying out of the acetylation of cellulose in accordance with my invention:

3200 lbs. of glacial acetic acid was placed in a 700 gal. tank equipped with a high speed propeller type agitator and 500 lbs. of cotton linters, which had been presoaked in acetic acid, was added thereto. The presoaked cellulose was produced by treating the linters with about 1500 lbs. of glacial acetic acid for 4 hrs. at a temperature of 100° F. The mixing tank was then tightly closed and the agitator was started and the pressure was reduced to about 35 mm. absolute pressure. By means of a closed pipe connection, a mixture of 1400 lbs. of 85% acetic anhydride and 8000 cc. of 94% sulphuric acid was introduced. The temperature rapidly rose to 100° F. at which point the acetic acid began to boil and condense in the reflux condenser. The temperature within the reacting mass remained at approximately 100° F. During the course of the reaction, samples were withdrawn at intervals by means of a vacuum bottle and the reaction was continued until the samples showed that the mass had reached the viscosity desired. When this point was reached, the reaction was stopped by feeding into the mixer, through a closed pipe, a mixture consisting of 343 pounds each of water and glacial acetic acid. This mixture provided sufficient water for hydrolysis and the solution or dope was discharged from the mixer into hydrolysis vessels where it was maintained at a constant temperature, such as 100° F. until acetone solubility was reached, whereupon it was precipitated by the method described in U. S. Patent No. 1,823,348, issued September 15, 1931, to Hans T. Clarke.

Other cellulose esters, such as cellulose acetate propionate or cellulose acetate butyrate, may be prepared in a process embodying my invention, either containing small or considerable amounts of propionic or butyric acid. It will be noticed that a substantial amount of catalyst was employed in the example given. Due to the careful control which is possible by my process, one is enabled to use substantial amounts of catalyst without deleteriously effecting the cellulose. Nevertheless, the invention is not restricted to large amounts of catalyst as acylation processes may be carried out using much smaller amounts of catalyst, such as 2000 cc. of sulphuric acid, with the same advantages which have been pointed out herein. The only criterion as to the amount of pressure in the esterification vessel is that at which the acetic acid will boil with the temperature at which it is desired to esterify the cellulose. In the example a temperature of approximately 100° F. was desired and consequently a pressure of 35 mm. was used.

My invention is particularly useful in the preparation of high viscosity esters in large scale batches, as the close regulation of the esterification temperature to avoid reducing the viscosity in processes of that nature is particularly important. With the use of exterior cooling, the size of the batches is limited especially in the preparation of high viscosity esters, due to the precise temperature control which it is usually desirable to maintain. The present invention assures control of the temperature of the entire batch so that a product of uniform degree of esterification and uniform viscosity characteristics is produced.

An advantage of my process over previous processes which have been employed to regulate the temperature of the reaction mixture by evaporation of some constituent therein is that the system in which the esterification is carried out in my process is under reduced pressure. Therefore, any leak which would occur therein would result in leakage in of outside air rather than loss of vapors. A leak, if stopped promptly, would result in no interruption in the continuation of the process unless that leak was large enough to interfere with the maintenance of the reduced pressure.

Obviously by its very nature, my invention is restricted to the esterification of cellulose in a liquid reaction mixture only, as in the vapor esterification of cellulose, the temperature control feature would be entirely absent.

It is to be understood that I am not to be limited by the specific example given, as to proportions or the nature of the materials employed. For instance, instead of cotton linters, other forms of esterifiable cellulose might be employed, such as refined wood pulp prepared by the sulfite process, regenerated cellulose prepared by the cupra-ammonium or viscose process or partially esterified cellulosic materials, such as cellulose ethers, nitrates or acetates having free and esterifiable hydroxyl groups.

My invention is adapted generally to the preparation of the lower fatty acid esters of cellulose, such as cellulose acetate, cellulose acetate propionate, cellulose acetate butyrate, cellulose propionate and cellulose butyrate. In the case of preparing cellulose acetate, cellulose acetate propionate or cellulose acetate butyrate in which acetic acid is employed in the esterification mixture, the pressure to give the desired temperature roughly corresponds to that at which acetic acid will boil at that temperature. If, however, a more volatile solvent, such as ethylene chloride is employed in the esterification mixture, the pressure need not be reduced so far to obtain the desired cooling effect.

When in the case of preparing cellulose propionate or cellulose butyrate in which no acetic acid is employed and the boiling of propionic acid or butyric acid must be depended upon, it will be necessary that the pressures be reduced to the point at which the desired temperature will be obtained.

The proper pressure at which a particular temperature may be obtained may easily be determined in the case of acetic acid by reference to a table of vapor pressures of that acid. If, for instance, it is desired that the temperature of the acetylation be maintained at approximately 120° F., the pressure to be maintained in the acetylating system would be approximately 55 mm. of mercury. If an acetylation temperature of approximately 85° F. is desired, the pressure would be maintained at approximately 20 mm. of mercury. Thus the temperature of the acetylation may be maintained at any temperature desired, merely by regulation of the pressure within the system. Also, the pressure in the system may be changed during the course of the acetylation which, of course, would raise or lower the maximum temperature therein.

In addition to the advantage of regulating the acetylation temperature, my invention also makes possible the regulation of the temperature of the mass after the esterification has been completed and the remaining anhydride is converted to the corresponding acid by addition of aqueous acid thereto. The sudden temperature rise occasioned by the addition of the water is avoided while maintainng the system under reduced pressure, as the evaporation of acetic acid and water within the acetylation mass produces a very uniform temperature. Thus the degradation of the cellulose is avoided and a more uniform product is obtained.

I claim:

1. The process of preparing a substantially completely esterified cellulose acetate which comprises esterifying cellulose in a liquid acetylation bath composed of sufficient acetic acid to dissolve the ester formed, sufficient acetic anhydride to completely acetylate the cellulose and an acylation catalyst, in an enclosed vessel having the pressure reduced to correspond to the vapor pressure of the acetic acid at the temperature which is to be maintained and maintaining at that pressure until the cellulosic material has been substantially completely esterified.

2. The process of preparing a substantially completely esterified cellulose acetate which comprises esterifying cellulose in a liquid acetylation bath composed of sufficient acetic acid to dissolve the cellulose ester formed, sufficient acetic anhydride to completely acetylate the cellulose and an acylation catalyst, in an enclosed vessel at a pressure of approximately 35 mm. of mercury which pressure is maintained until the cellulose has been substantially completely esterified.

3. The method of regulating the acetylation of cellulosic material in a liquid acetylation bath containing sufficient liquid to dissolve the cellulose ester formed and sufficient lower fatty acid anhydride to completely acetylate the cellulose which comprises reducing the pressure in the vessel in which the acylation is carried out to correspond to the vapor pressure of the lowest boiling constituent therein at the temperature which is to be maintained and maintaining at that pressure until the cellulosic material has been substantially completely esterified.

4. The method of regulating the acetylation of cellulosic material in a liquid acetylation bath containing sufficient liquid to dissolve the cellulose ester formed and sufficient lower fatty acid anhydride to completely acetylate the cellulose which comprises maintaining the pressure within the vessel in which the acylation is carried out at approximately 20–55 mm. of mercury which pressure is maintained until the cellulose has been substantially completely esterified.

5. The method of regulating the acetylation of cellulosic material in a liquid acetylation bath containing sufficient acetic acid to dissolve the cellulose ester formed and sufficient acetic anhydride to completely acetylate the cellulose which comprises reducing the pressure in the vessel in which the acylation is carried out to correspond to the vapor pressure of the acetic acid at the temperature which is to be maintained and maintaining at that pressure until the cellulosic material has been substantially completely esterified.

6. The method of regulating the acetylation of cellulosic material in a liquid acetylation bath containing sufficient acetic acid to dissolve the cellulose ester formed and sufficient acetic anhydride to completely acetylate the cellulose which comprises reducing the pressure in the vessel in which the acylation is carried out to approximately 35 mm. of mercury and maintaining at that pressure until the cellulosic material has been completely esterified.

HERBERT G. STONE.